United States Patent
Porco

(10) Patent No.: US 8,844,915 B2
(45) Date of Patent: Sep. 30, 2014

(54) FIXTURE AND METHOD OF WELDING LOCOMOTIVE SILLS

(75) Inventor: Antonio Porco, Sault Ste. Marie (CA)

(73) Assignee: Superior Industrial Services, Sault Ste. Marie (CA)

( * ) Notice: Subject to any disclaimer, the term of this patent is extended or adjusted under 35 U.S.C. 154(b) by 35 days.

(21) Appl. No.: 13/408,653

(22) Filed: Feb. 29, 2012

(65) Prior Publication Data

US 2013/0221591 A1    Aug. 29, 2013

(51) Int. Cl.
| | |
|---|---|
| B25B 1/20 | (2006.01) |
| H05B 1/00 | (2006.01) |
| B23K 9/00 | (2006.01) |
| B23K 9/007 | (2006.01) |
| B23Q 3/00 | (2006.01) |

(52) U.S. Cl.
USPC .................................. 269/37; 219/53; 219/54

(58) Field of Classification Search
USPC .............................. 269/37; 219/53, 54, 125.12
See application file for complete search history.

(56) References Cited

U.S. PATENT DOCUMENTS

| | | | | |
|---|---|---|---|---|
| 4,236,453 A | * | 12/1980 | Collen | 104/15 |
| 4,313,382 A | * | 2/1982 | Bommart | 104/307 |
| 4,414,454 A | * | 11/1983 | Zollinger | 219/53 |
| 4,929,816 A | * | 5/1990 | Theurer et al. | 219/53 |
| 5,006,198 A | * | 4/1991 | Pasquini | 156/559 |
| 5,136,140 A | * | 8/1992 | Theurer et al. | 219/161 |
| 5,175,405 A | * | 12/1992 | Karimine et al. | 219/54 |
| 5,203,814 A | * | 4/1993 | Kushizaki et al. | 29/897.2 |
| 5,270,514 A | * | 12/1993 | Wechselberger et al. | 219/100 |
| 5,575,416 A | * | 11/1996 | Oellerer et al. | 228/49.1 |
| 5,941,514 A | * | 8/1999 | Burcaw | 269/37 |
| 6,069,333 A | * | 5/2000 | Morlock | 219/54 |
| 6,166,347 A | * | 12/2000 | Morlock | 219/54 |
| 6,207,920 B1 | * | 3/2001 | Morlock | 219/54 |
| 6,297,472 B1 | * | 10/2001 | Bong et al. | 219/125.12 |
| 6,355,906 B1 | * | 3/2002 | Okuno et al. | 219/121.63 |
| 6,396,020 B1 | * | 5/2002 | Thelen et al. | 219/54 |
| 6,407,364 B1 | * | 6/2002 | Mumaw | 219/125.12 |
| 6,764,434 B1 | * | 7/2004 | Volk | 483/36 |
| 6,787,726 B2 | * | 9/2004 | Thelen et al. | 219/54 |
| 7,520,415 B2 | * | 4/2009 | Kral et al. | 228/119 |
| 7,523,707 B2 | * | 4/2009 | Theurer et al. | 104/15 |
| 7,753,351 B2 | * | 7/2010 | Yajima et al. | 269/152 |
| 7,866,642 B2 | * | 1/2011 | McAllister | 269/37 |

* cited by examiner

*Primary Examiner* — Lee D Wilson
*Assistant Examiner* — Alvin Grant
(74) *Attorney, Agent, or Firm* — John R. S. Orange; Blake, Cassels & Graydon LLP

(57) ABSTRACT

A welding fixture for use during welding of a web member to a flange member to produce a sill, includes an elongate bed having a pair of opposed longitudinal edge rails, and a plurality of clamp assemblies mounted at spaced intervals along each of the longitudinal edge rails. Each clamp assembly is selectively movable between an open configuration in which a welding head can move past the clamp assembly while welding the web member to the flange member, and a closed configuration in which the clamp assembly is operative to hold the web member and the flange member in a predetermined orientation relative to each other.

8 Claims, 9 Drawing Sheets

TACKING PHASE

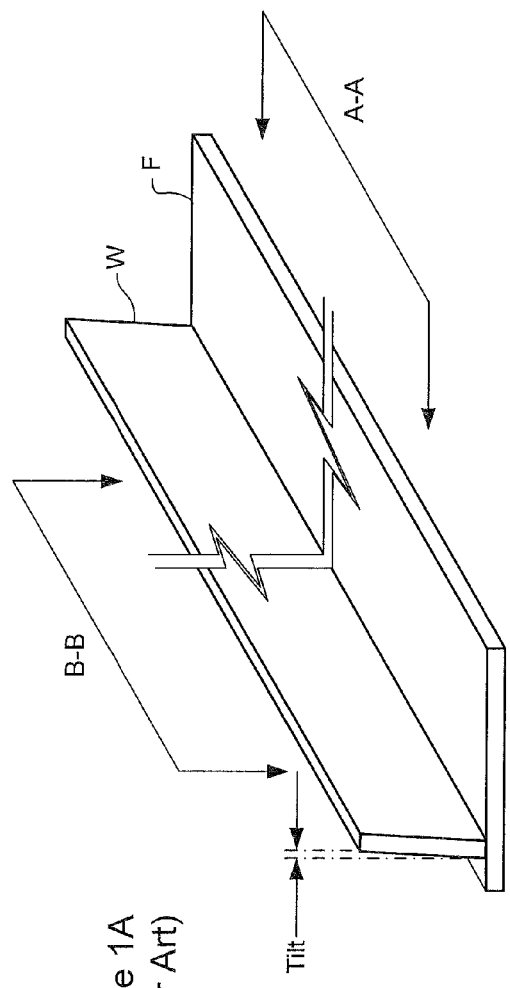
Figure 1A
(Prior Art)
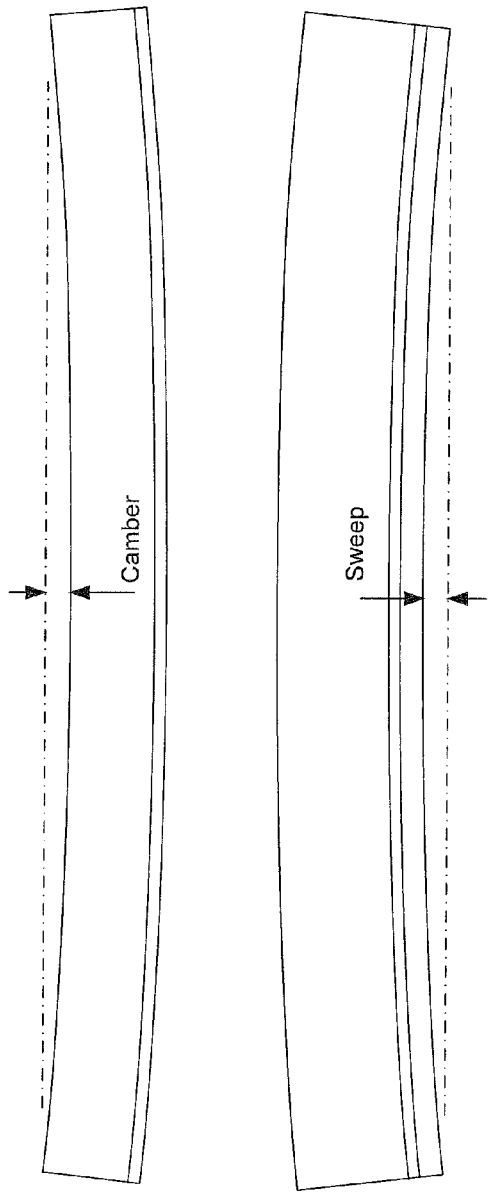
Figure 1B
(Prior Art)
A-A
(Side View)
Figure 1C
(Prior Art)
View B-B
(Top View)

Section C-C

FLANGE ON TABLE

Section D-D

FIXTURE AND METHOD OF WELDING LOCOMOTIVE SILLS

CROSS-REFERENCE TO RELATED APPLICATIONS

This is the first application filed in respect of the present invention.

FIELD OF THE INVENTION

The present application relates generally to welding fixtures and methods, and more specifically, to a fixture and method of welding load bearing structural members, such as locomotive sills.

BACKGROUND

The chassis of a railway locomotive includes a pair of longitudinal sills, which disposed along opposite sides of the locomotive. Referring to FIGS. 1A-C, a sill is typically formed by welding a web member W to a flange member F to form an approximately T-shaped cross section. Intentionally, the completed sill is not straight. Typically, it is desired that the sill have predetermined amounts of camber, sweep, and tilt.

Camber refers to the curvature of the sill in a plane corresponding to the web, which is often measured as a linear deviation of the sill from an imaginary straight line extending between the ends of the sill, as may be seen in FIG. 1B. Typical locomotive specifications require a camber of up to about 5 inches, measured at the midpoint of the sill, which may be 40 feet long.

Sweep refers to the curvature of the sill in a plane corresponding to the flange, which is often measured as a linear deviation of the sill from an imaginary straight line extending between the ends of the sill, as may be seen in FIG. 1C. Typical locomotive specifications require a sweep of up to about ⅝ inch, measured at the midpoint of the sill.

Tilt refers to the difference between 90 degrees and the actual angle between the web and the flange. As may be seen in FIG. 1A, the tilt is often expressed as a linear deviation of the sill from an imaginary straight line extending 90 degrees to the plane of the flange. Typical locomotive specifications permit a tilt tolerance of about ¼ inch, which is typically measured using a calibrated square at the base of the sill.

Typically, a locomotive sill is assembled using the following process. Firstly, the web and flange are mounted on a support beam, in the desired orientation relative to each other and tacked together by short welds. The two pieces are then welded together, for example using at a pull through double head sub arc welding machine. Due to the thermal stresses of the welding process, the welded sill is typically warped in all three planes, so that the tilt, sweep and camber all lie outside of allowable tolerances for the finished sill. In this case, the welded sill is heat treated by experienced repairmen to further warp the sill until the tilt, sweep and camber all lie within the allowable tolerances. Finally, the treated sill is sent to a detailing area where drills and torches are used by experienced tradesmen to manually cut the holes and end contours required by the design specifications of the sill.

This process is both labour intensive and does not yield easily reproducible results, in that, while each completed sill lies within acceptable tolerances, it is very difficult to produce two identical sills. Similar considerations apply in welding other large structural elements where the relative disposition of a pair of plates must meet specified tolerances after the welding process.

A process for manufacturing such structures that overcomes deficiencies in the prior art, would be highly desirable.

SUMMARY

An aspect of the present invention provides a method and apparatus for welding such structures, and in particular, a locomotive sill.

BRIEF DESCRIPTION OF THE DRAWINGS

Further features and advantages of the present invention will become apparent from the following detailed description, taken in combination with the appended drawings, in which:

FIGS. 1A-1C respectively show perspective, top and side views of a locomotive sill;

DETAILED DESCRIPTION

Figure 3:
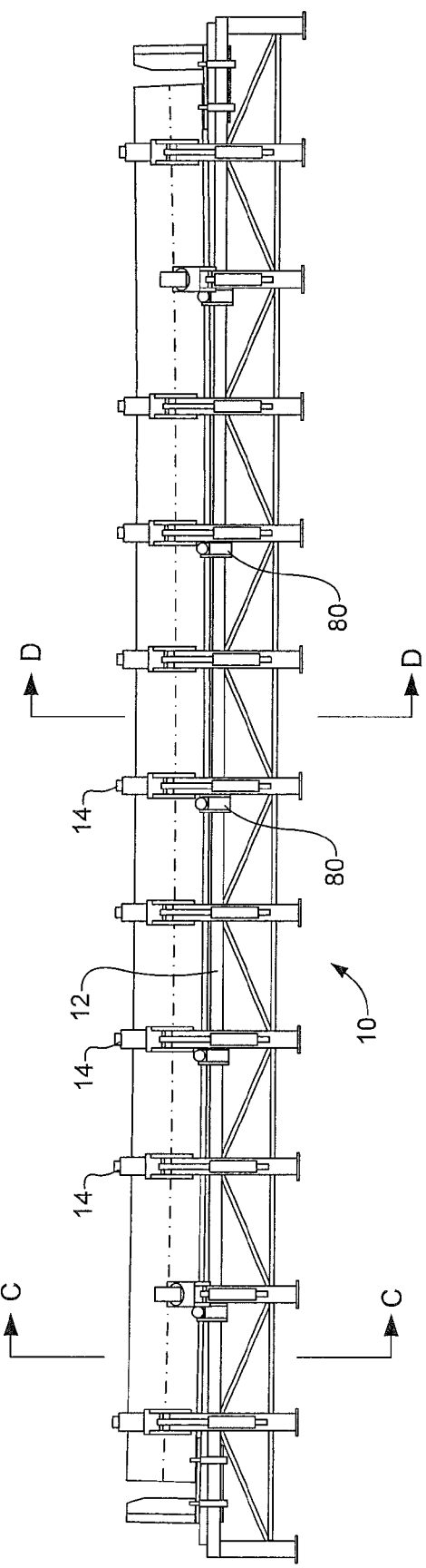
FIG. 3 is a side view of the bed of FIG. 2.

A welding fixture disclosed herein generally comprises an elongate bed 10 having a pair of opposed longitudinal edge rails 12 and a plurality of clamping assemblies 14 mounted at spaced intervals along each of the longitudinal edge rails 12, as seen in FIG. 3.

In a representative embodiment, the bed may be approximately 40 feet in length, and include 11 clamping assemblies 14.

Figure 2:
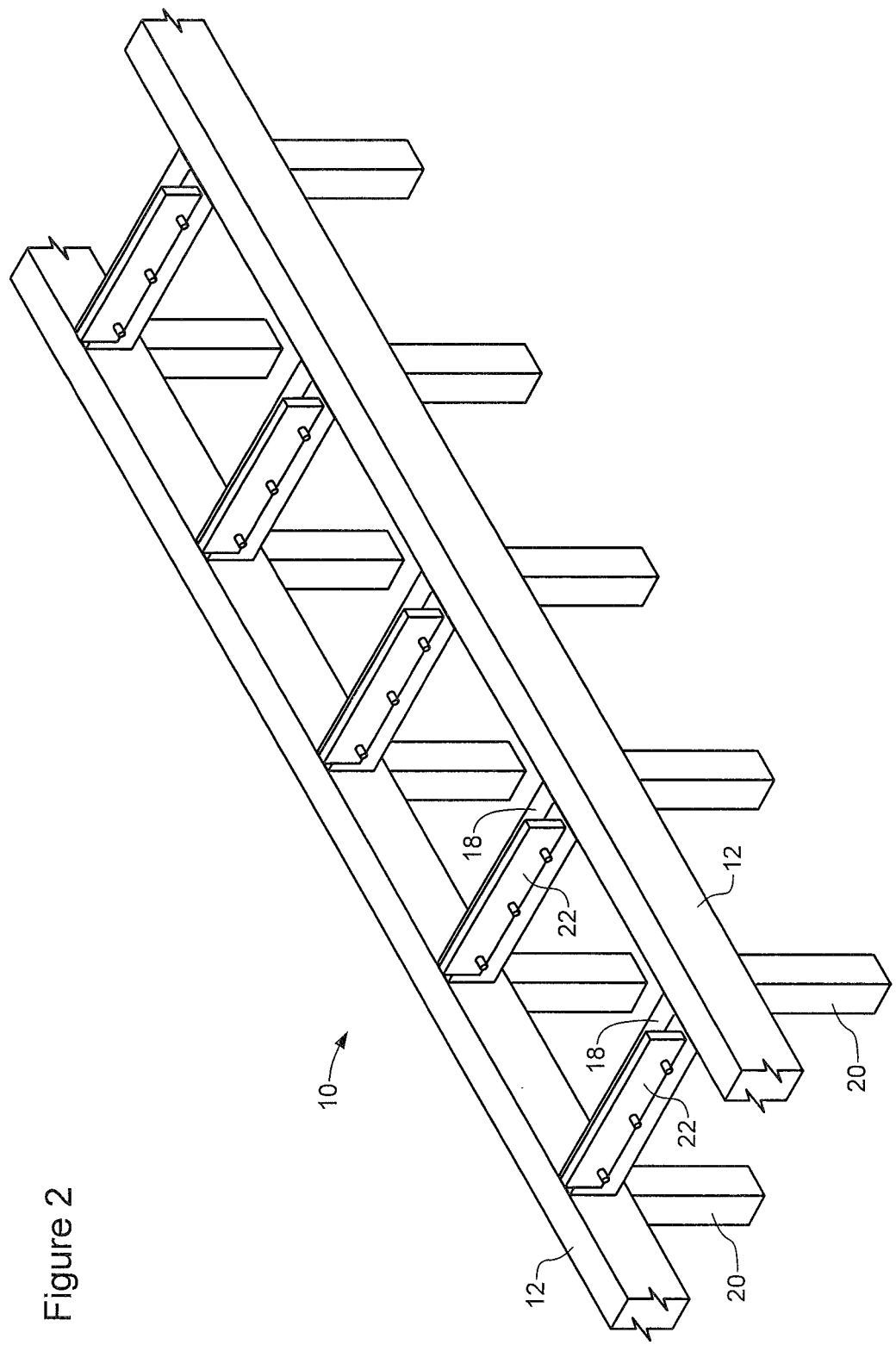
FIG. 2 shows a perspective view of a bed

As may be seen in FIG. 2, the bed 10 is provided as a substantially rigid structure, and may, for example, be formed of longitudinal support rails and a plurality of transversally disposed beam members 18. Suitable legs 20 may be used to support the bed 10 at a desired height, and may be securely anchored to a floor or other foundation structure (not shown) to increase strength and rigidity. In preferred embodiments, the bed 10 is configured to establish a desired camber of the completed sill. In the embodiment of FIG. 2, this is accomplished by respective flange support plates 22 affixed to each transversal beam member 18, for example by means of suitable pins or bolts. The desired camber of can thus be established by suitable selection of the height dimension of the respective flange support plate 22 affixed to each beam member 18. This is advantageous in that it enables the bed 10 to be used to construct locomotive sills with differing camber specifications.

Each clamping assembly 14 is selectively movable between an open and a closed configuration. In the closed configuration, the clamping assembly is operative to hold a sill web member and a sill flange member in a predetermined orientation relative to each other. In the open configuration, the clamp assembly permits free movement of a welding head past the clamping assembly. Each of the clamping assemblies is independently moveable between open and closed positions to allow the welding head to move progressively along the bed 10.

Figure 4:
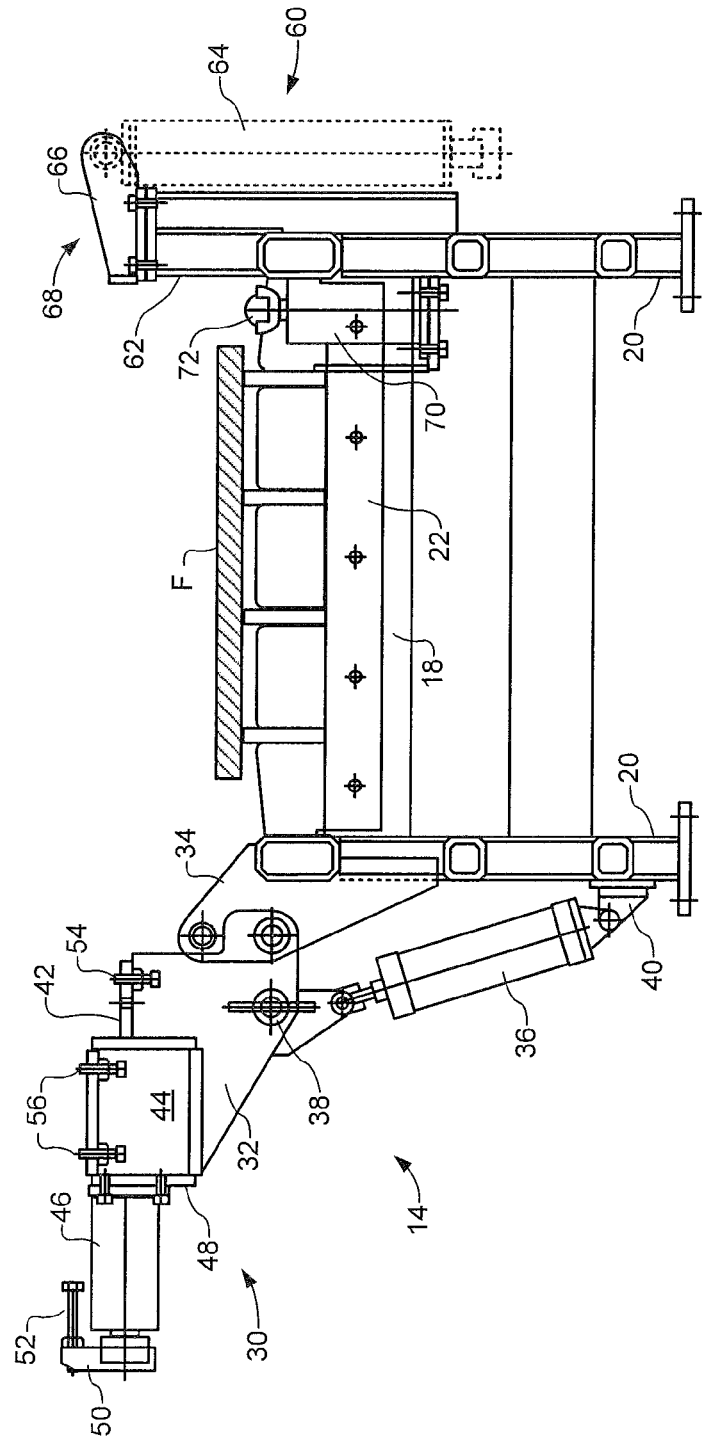
FIG. 4 is a view on the line C-C of FIG. 3.

The clamping assemblies 14 are distributed along either side of the bed 14 and include top clamps 30 and side clamps 60, as shown in FIG. 4. Alignment actuators 80 (FIG. 5) are disposed along the bed 10 between the side clamps 60 to assist in positioning a flange F.

In the closed configuration of the clamping assembly (FIGS. 5 and 6), the top and side clamp 30, 60 are positioned to cooperate with each other to hold the flange and web members of a sill being assembled in the required orientation.

The top clamp 30 includes an arm 32 that is pivotally connected to a bracket 34. A hydraulic actuator 36 is connected between a pin 38 on the arm 32 and a mounting bracket 40 on a leg 20 of the gantry 10. The actuator 36 is operable to move the arm 32 from the open position shown in FIG. 4 to the closed position shown in FIGS. 5 and 6.

A plate 42 extends to opposite sides of the arm 32, and a box shaped mounting pad 44 is formed on the arm 32 and supports a hydraulic actuator 46 on its upper face 48. The actuator 46 carries a hold down arm 50 which extends to one side of the actuator 46 and has an adjustable shoe 52 mounted at its distal end.

An adjustable stop 54 is provided on the plate 42 to provide an abutment for aligning a flange F carried on the bed 10. Similarly, the outer face of the pad 44 carries a pair of adjustable stops 56 that provide abutment for a web W to be positioned for welding to a flange F. As shown, the stops 54, 56 are adjustable bolts that can be locked in position and provide the required alignment for the flange and web along the gantry.

Figure 6:
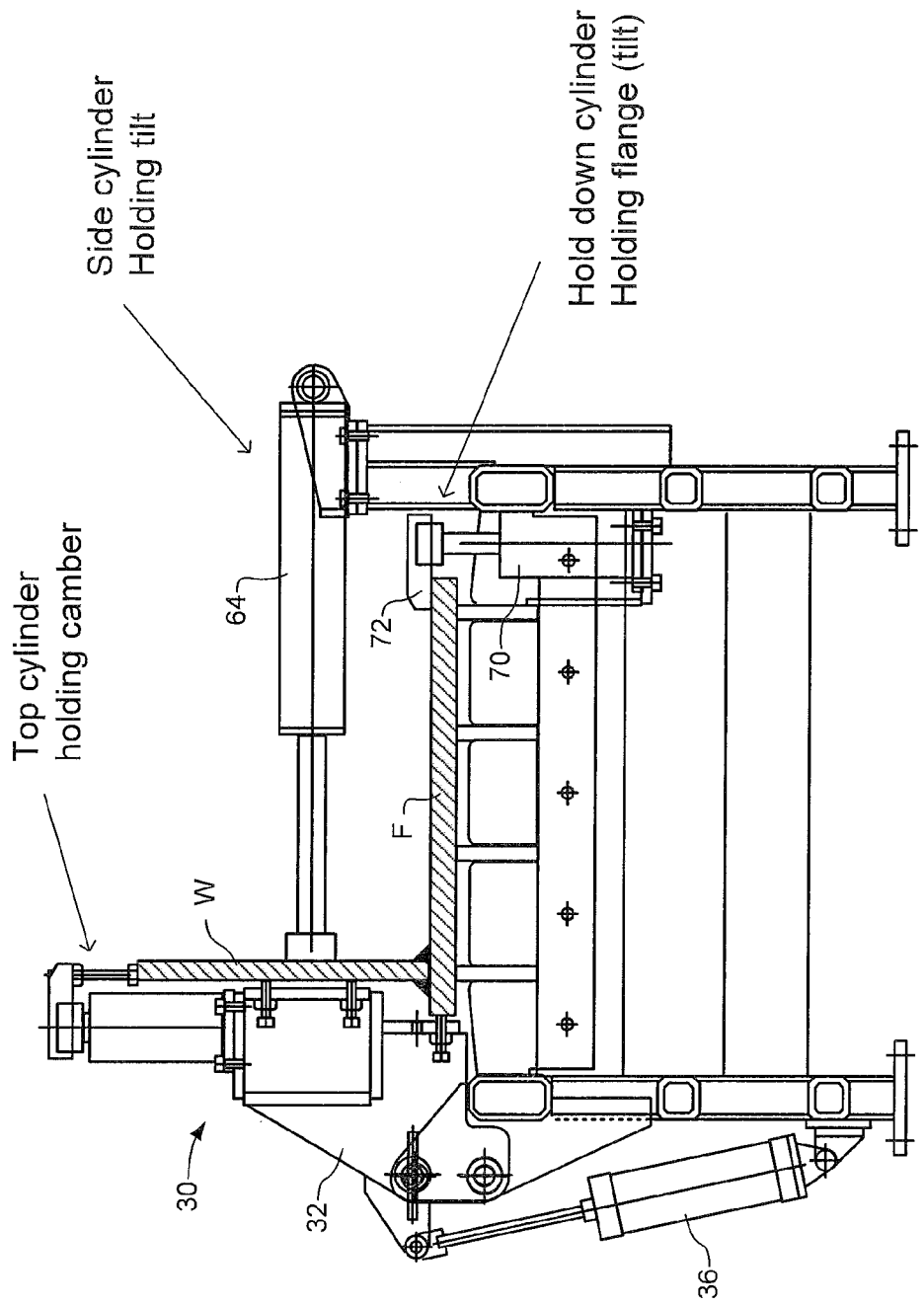
FIG. 6 is a view similar to FIG. 4 in a clamping position.

The side clamp 60 includes a mounting pedestal 62 located on the opposite side of the gantry to the top clamp 30. An actuator 64 is pivotally connected to the pedestal through a bracket 66. The bracket 66 has a pair of spaced ears 68 that allow the actuators 64 to pass between the ears and move from a vertical hanging position as shown in FIG. 4 to a horizontal position as shown in FIG. 6. In the horizontal position the body of the actuator 64 is supported on the pedestal 62 between the ears 68 of bracket 66 to maintain a stable position. The actuator 64 is extendable to engage the web and hold it against the stops 56. The actuator 64 may be pivoted between the vertical hanging position (FIG. 4) and the horizontal position (FIG. 6) either manually, or by means of a suitable actuator such as, for example, an hydraulic servo mechanism (not shown).

The side clamp 60 also includes a hold down cylinder 70 having a shoe 72 carried on the cylinder rod. The hold down cylinder 70 is mounted adjacent to the pedestal 62 and the shoe 72 may be rotated about a vertical axis so as to overlap and engage the surface of the flange supported on the bed 10.

Figure 5:
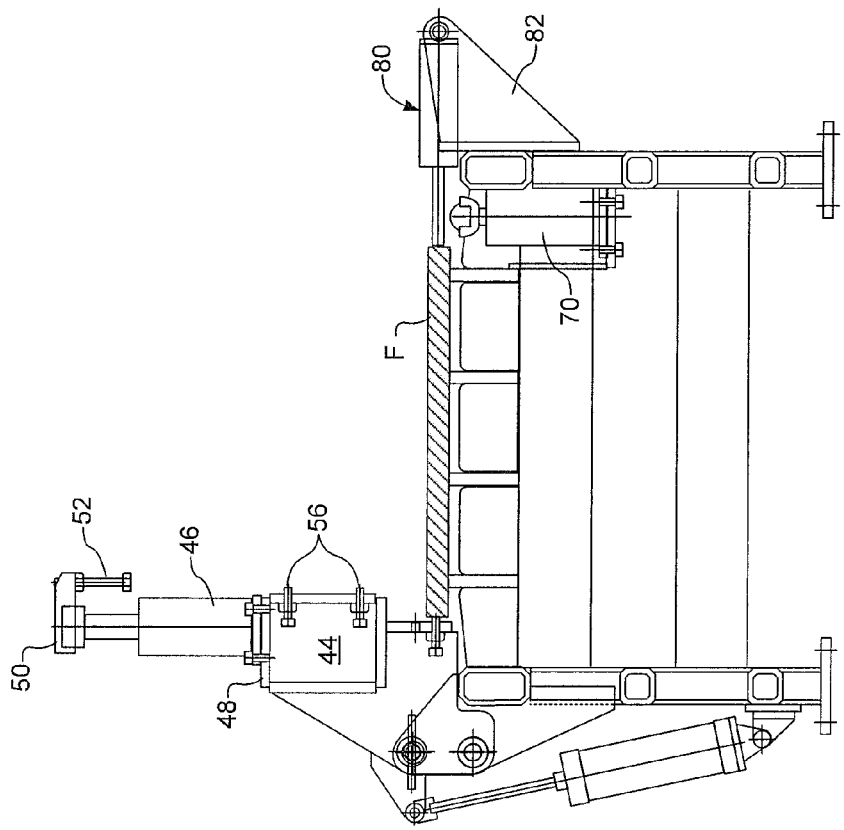
FIG. 5 is a view on the line D-D of FIG. 3.

The positioning of the flange F against the stops 54 is facilitated by the alignment actuators 80 shown in FIG. 5. The actuators 80 are distributed along the length of the bed 10 on hangers 82. The actuator 80 is pivotally connected to the hanger so that it may hang vertically along side the bed 10 when not in use. When in use, as shown in FIG. 5, the actuator is supported on the side rails 12 and the rod of the actuator is aligned with the edge of the flange supported on the bed. The actuator 80 may be extended to move the flange laterally on the bed against the stops 54 and thereby ensure the flange is properly located against the stops 54.

In the illustrated embodiment, the stops 54, 56 provide abutments against which the flange and web members can be pressed to establish their respective position and orientation. The respective stops on the set of top clamps 30 arranged along the length of the bed 10 are adjusted so as to define both the desired tilt of the web and the desired sweep of the completed sill. The hydraulic actuator 46 of the top clamp 30 can be used to press the web and flange together in preparation for welding. Also in the illustrated embodiment, the side clamps 60 use the set of hydraulically actuated actuators 64 to press the flange and web against the stops of the top clamp 30.

As will be described in greater detail blow, the web member W is preferably shaped to include the desired camber of the completed sill. In this case, the pressure of the top clamp, in combination with the configuration of the bed 10, forces the flange to conform to the desired camber.

With this arrangement, the top and side clamps cooperate to firmly hold the web and flange members together, both in preparation for, and during the welding process.

In use, the flange F and web members W are formed in accordance with the design specifications for the completed sill. In some embodiments, this forming process may include cutting the flange and web members from steel blanks, including shaping the edges of the web and flange members to follow the desired camber and sweep, respectively. Known laser or plasma cutting techniques may be to form the web and flange members, but this is not essential. Once formed, the flange F is positioned on the bed 10 using the alignment actuators 80. The hold down actuators 70 are extended and positioned to engage the edge of the flange F and conform it to the profile of the bed 10. The web W is positioned on the flange F and secured against the stops 56 by the actuators 64 that are swung from the vertical to horizontal position. The actuator 46 swings the arm 32 to a vertical position. The actuator 46 is retracted to bring the shoe 52 into engagement with upper edge of the web W. The web W and flange F are held in place by the clamp assemblies. The pressure of all of the clamp assemblies establishes the desired final form of the sill, including the web and flange contours, the camber, sweep and tilt.

Figure 7:
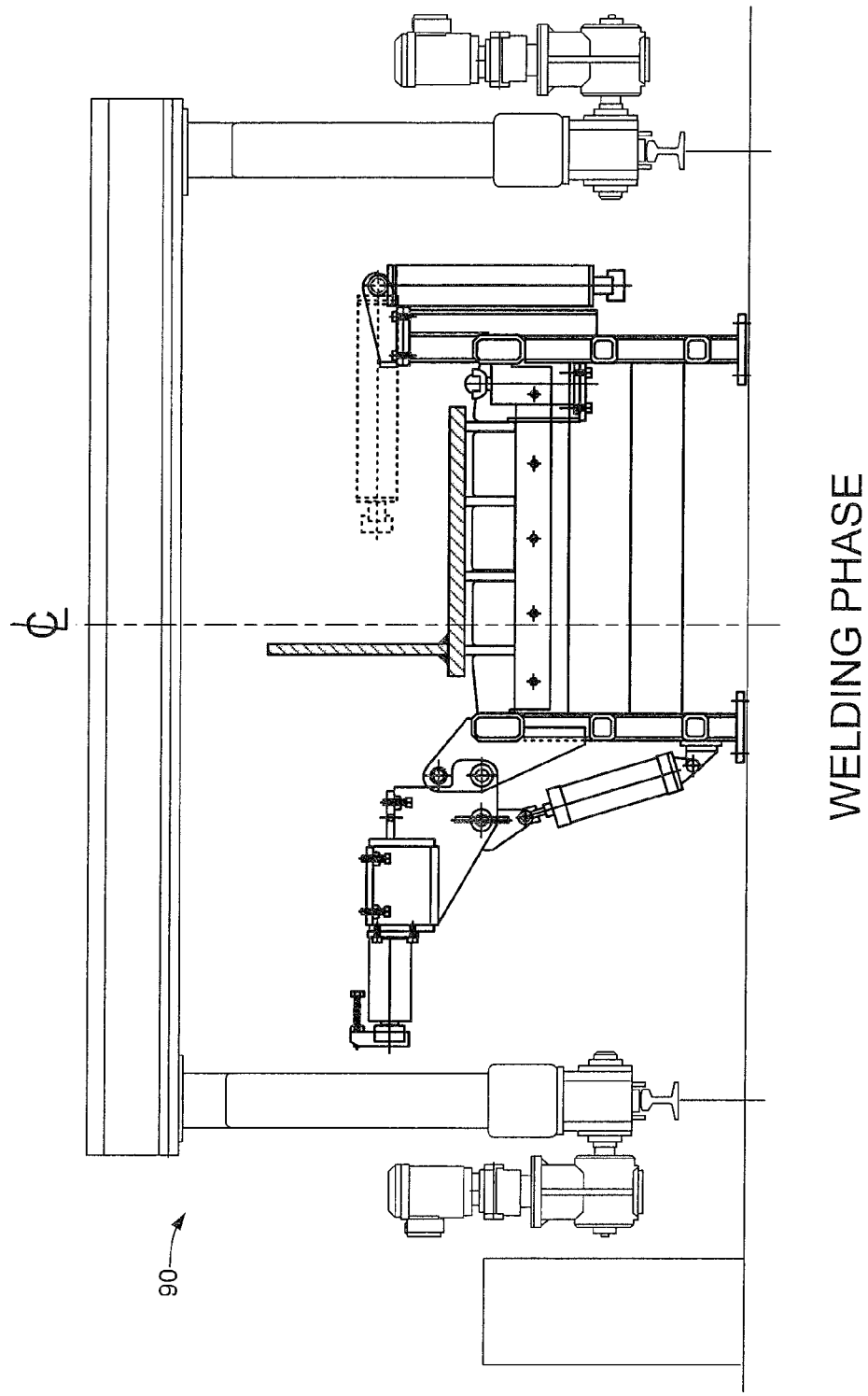
FIG. 7 is an end view of the gantry of FIG. 2 during a welding operation.

Once the fame and web members are secured on the bed, the two pieces can be welded together. Preferably, both sides of the web are welded simultaneously, so as to minimize uneven internal stresses after the welds cool. This can be accomplished using a double headed welder 90 mounted on a carriage as shown in FIG. 7 that is configured to traverse the length of the bed 10. Suitable carriage-mounted welders are known in the art, and so are not shown or described herein in detail. As the welding carriage approaches a clamp assembly, that assembly can be opened to permit the head of the welder to pass. Once the head has passed the clamp assembly, the clamp assembly can be closed again to secure the web and flange while the welds cool. It will be appreciated that, with this arrangement, the web and flange member are firmly held by clamp assemblies both ahead of and behind the head of the welder. This minimizes movement of the web W and flange F during the welding process and, in combination with simultaneous welding of both sides of the web, minimizes undesired warping of the finished sill. It will also be appreciated that the side clamp 60 need only retract the actuator 64 to allow passage of the heads and the alignment actuators may stay in situ during welding.

Further reductions in warping may be obtained by welding the flange and web together in multiple passes. For example, in a first pass, the welder may be controlled to form a plurality of "tack" welds of a predetermined length and at selected intervals along the length of the sill. In a second pass, the welder can be controlled to form welds that at least partially fill in the gaps between the tack welds formed during the first pass. A third pass may then be used to form a continuous weld along the entire length of the sill.

Once the welds are complete the heat affected zone may be further heat treated to relieve internal stresses.

Once the welded sill has cooled sufficiently, all of the clamp assemblies can be opened to permit removal of the sill from the gantry.

The fixture and method described above are advantageous in that the process of manufacturing the sill is less labour intensive and more repeatable than prior art methods. In particular, the use of multiple clamping assemblies along the length of the gantry, in combination with double-sided welding as described above, enables repeatable manufacture of welded sills that meet design specifications for camber, sweep and tilt at the time the sill is released from the gantry. This reduces the prior art requirement for skilled repairmen to correct warpage and bring the welded sill into conformance with design specifications. In the prior art methods, detailing of the welded sill (eg cutting of holes and end contours) must be delayed until after the repairmen have corrected warpage, because this is the only way to ensure that the holes are properly located on the finished sill. However, when using the fixture and method described above, the repeatability of the welding process means that the detailing can be implemented before the web and flange members are welded together. This, in turn, enables automated methods, such as computer numerically controlled (CNC) plasma or laser cutters, to be used for this process, further reducing labour requirements while improving the quality of the finished sill.

Figure 8:
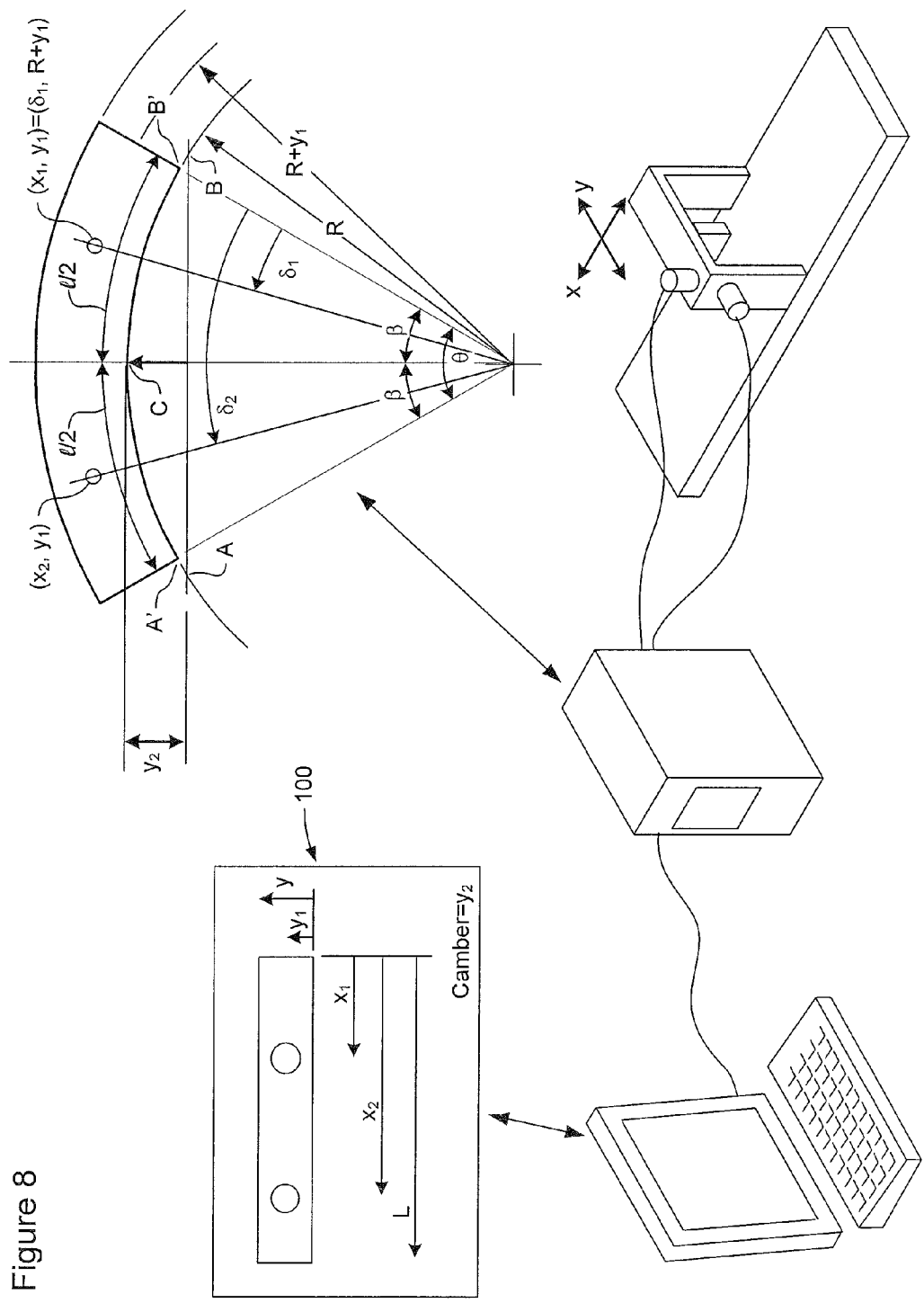
FIG. 8. is a schematic layout of an automated process for profiling and laying out the weldments.
Figure 9:
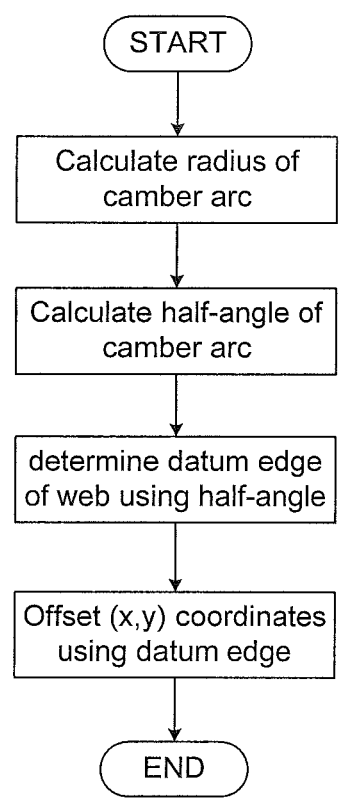
FIG. 9 is a flow-chart showing principal steps in a process of offsetting design dimensions to accommodate camber and sweep It will be noted that throughout the appended drawings, like features are identified by like reference numerals.

In the foregoing description, the web and flange members are cut and detailed prior to being mounted on the bed and welded together. It is contemplated that this will normally require also cutting the web and flange to form the camber and sweep, respectively. In most cases the design specifications for locomotive sills are laid out in rectangular coordinates, ignoring the camber and sweep, which are specified separately. In this case, the specified locations of each feature (edges, holes etc.) of the finished sill must be properly skewed to accommodate the specified camber and sweep. In FIG. 8 there is shown schematically the conversion of a drawing showing the finished, loaded sill into a data set representing the path or a cutting head to attain the required pre-cut blank. A flowchart illustrating a representative method performed by the apparatus of FIG. 8, is set out in FIG. 9. A directly analogous method can be used to perform the skew operation on the flange member, which establishes the specified sweep.

Referring to FIG. 8 a drawing of the finished dimensions of the web W is shown at 100. This drawing may of course be recorded in a non transient memory fir accessing by a computer program for display on a computing device 100. The dimensions are shown in linear dimensions x and y from a floating datum as is conventional. As a first step, the specified camber (which is normally defined as a linear offset) and the required length of the web are used to determine the camber arc, which is the sector of a circle that extends the length of the web, and has a maximum height corresponding to the specified camber. This step may be performed either graphically (e.g. using a suitable drawing software) or analytically, as desired. A representative graphical method using Autocad® is as follows:

To establish the data set used to control the cutting head, the required web length L and the specified camber $Y_2$ are used to generate an arc of a circle to represent the lower edge of the web W. This is done by establishing a pair of points spaced apart a distance L and a third point midway between the pair of points and offset by the camber $Y_2$. These points are indicated at ABC respectively in FIG. 8.

Using the points ABC, the CAD drawing program running in the computing device generates a data string representative of an arc of a circle passing through the points AB and C. The radius R and centre O of that circle is determined.

Using the radius R and the web length L, the included angle θ between end points of the arc may be established as L=Rθ. Each end point lies on the arc displaced θ/2 from the midpoint of arc, and is displaced a small distance from the points A, B, as indicated at A', B' on FIG. 8.

Using one of the end points A', B' as a datum, the Cartesian coordinates of the features are converted into polar coordinates with the x dimension corresponding to $R\gamma_n$, and the y coordinate as $R+y_n$. For example, the centre ($x_1$ $y_1$) of the aperture is transformed to polar coordinates ($R+y_1$, $\gamma_1$). The radius of the aperture is specified and the periphery of the hole can then be determined, either as polar or Cartesian coordinates. Each of the coordinates may then be assembled into a data set representing the points on the blank that is to form the web, and stored in a non transient memory in the computing device.

The data set is then transformed by the computing device in to a set of commands to control the plasma head or similar cutting tool and cut the blank to have the required features. The web may then be assembled using the operations as shown in FIGS. 4 to 7.

We claim:

1. A welding fixture for use during welding of a web member to a flange member to produce a sill, the welding fixture comprising:
   an elongate bed having a pair of opposed longitudinal edge rails;
   a first set of abutments along one edge of said bed to define a lateral position for a flange supported on said bed;
   a plurality of actuators each acting in a direction generally parallel to said bed to move said flange against said first set of abutments;
   a plurality of clamp assemblies mounted at spaced intervals along each of the longitudinal edge rails;
   wherein each clamp assembly is selectively movable between an open configuration in which a welding head can move past the clamp assembly while welding the web member to the flange member, and a closed configuration in which the clamp assembly is operative to hold the web member and the flange member in a predetermined orientation relative to each other;
   each of said clamp assemblies including a second set of abutments to define a lateral position for a web relative to said bed; and
   a first clamp acting in a direction generally parallel to said bed to hold a web against said second set of abutments and a second clamp acting in a direction normal to said bed to hold a web against a flange supported on said bed.

2. The welding fixture as claimed in claim 1, wherein each clamp assembly comprises:
   a top clamp assembly pivotally movable between an open position and a closed position, the top clamp assembly including a body carrying said second set of abutments on one face thereof and said first clamp mounted on one end of said body.

3. The welding fixture as claimed in claim 1, wherein said second set of abutments is adjustable relative to said bed.

4. The welding fixture as claimed in claim 1, wherein the elongate bed is adjustable to vary the relative position of the plurality of clamp assemblies and said bed to define a predetermined camber of the sill.

5. The welding fixture as claimed in claim 4, wherein the elongate bed comprises a plurality of flange support plates mounted at spaced intervals along the bed, a respective height dimension of each flange support plate following the predetermined camber.

6. The welding fixture as claimed in claim 1, wherein the second set of abutments are adjustable whereby the plurality of clamp assemblies cooperate to define a predetermined sweep of the sill.

7. The welding fixture as claimed in claim 6, wherein each clamp assembly comprises:
   a pair of adjustable stops configured to define, in the dosed configuration of the damp assembly, an abutment for the web member; and
   a side damp configured, in the dosed configuration of the damp assembly, to force the web member into engagement with the adjustable stops;
   wherein respective settings of the adjustable stops of each of the damp assemblies are selected to establish the predetermined sweep.

8. The welding fixture as claimed in claim 6, wherein said pair of adjustable stops are independently adjustable to different lateral positions relative to said bed, the elongate bed and the plurality of damp assemblies thereby cooperating to define a predetermined tilt of the web member relative to the flange member.

\* \* \* \* \*